US011080206B2

(12) United States Patent
Munshi et al.

(10) Patent No.: US 11,080,206 B2
(45) Date of Patent: Aug. 3, 2021

(54) RING STRUCTURE OF PRIORITY QUEUES FOR MEMORY CACHE

(71) Applicant: HEWLETT PACKARD ENTERPRISE DEVELOPMENT LP, Houston, TX (US)

(72) Inventors: Siddharth Munshi, Apex, NC (US); Biswajit Mazumder, Cary, NC (US); Vinay Manivel, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 92 days.

(21) Appl. No.: 16/669,832

(22) Filed: Oct. 31, 2019

(65) Prior Publication Data

US 2021/0133118 A1    May 6, 2021

(51) Int. Cl.
*G06F 12/12* (2016.01)
*G06F 12/126* (2016.01)
*G06F 12/0891* (2016.01)
*G06F 12/0893* (2016.01)

(52) U.S. Cl.
CPC ........ *G06F 12/126* (2013.01); *G06F 12/0891* (2013.01); *G06F 12/0893* (2013.01); *G06F 2212/604* (2013.01)

(58) Field of Classification Search
CPC .... G06F 12/12; G06F 12/126; G06F 12/0891; G06F 12/0893; G06F 2212/604
See application file for complete search history.

(56) References Cited

U.S. PATENT DOCUMENTS

| | | | | |
|---|---|---|---|---|
| 7,020,143 | B2* | 3/2006 | Zdan | ...................... H04L 45/00 370/229 |
| 9,043,542 | B2 | 5/2015 | Kimmel et al. | |
| 9,760,309 | B2 | 9/2017 | Ioannou et al. | |
| 9,772,939 | B2 | 9/2017 | Gupta et al. | |
| 2007/0283131 | A1* | 12/2007 | Sagalovitch | ............ G06F 9/485 712/203 |
| 2016/0371225 | A1 | 12/2016 | Denz et al. | |

(Continued)

OTHER PUBLICATIONS

G. Komaros, T. Orphanoudakis and Y. Papaefstathiou, "Active flow identifiers for scalable, QoS scheduling in 10-Gbps network processors," Proceedings of the 2003 International Symposium on Circuits and Systems, 2003. ISCAS '03., Bangkok, Thailand, 2003, pp. II-97-II-100.*

(Continued)

*Primary Examiner* — Pierre Miche Bataille
(74) *Attorney, Agent, or Firm* — Trop, Pruner & Hu, P.C.

(57) ABSTRACT

A computer implemented method includes: storing identifiers of cached data blocks stored in a ring structure comprising a plurality of queues, where each queue is assigned a different priority level based on a base pointer, and where the plurality of queues includes a subset of queues associated with an insertion range of priority levels; during a plurality of partial rotations of the ring structure, inserting new identifiers of data blocks associated with a plurality of processing engines into the subset of queues, where each partial rotation shifts the base pointer to a next higher queue; and maintaining, for multiple partial rotations, an association between a first processing engine and a first queue of the subset of queues until the first queue is shifted out of the insertion range of priority levels.

20 Claims, 9 Drawing Sheets

(56) References Cited

U.S. PATENT DOCUMENTS

2017/0293570 A1* 10/2017 Wang .................. G06F 12/0868
2018/0173461 A1*  6/2018 Carroll .................... G06F 3/068

OTHER PUBLICATIONS

N. Baudis, F. Jacob and P. Andelfinger, "Performance Evaluation of Priority Queues for Fine-Grained Parallel Tasks on GPUs," 2017 IEEE 25th International Symposium on Modeling, Analysis, and Simulation of Computer and Telecommunication Systems (MASCOTS), Banff, AB, Canada, 2017, pp. 1-11.*
H. Sundell and P. Tsigas, "Fast and lock-free concurrent priority queues for multi-thread systems," Proceedings International Parallel and Distributed Processing Symposium, Nice, France, 2003, pp. 11 pp.*
A. Morton, J. Liu and I. Song, "Efficient Priority-Queue Data Structure for Hardware Implementation," 2007 International Conference on Field Programmable Logic and Applications, Amsterdam, Netherlands, 2007, pp. 476-479.*
Manes, B., "Design," Ben-manes/caffeine, Mar. 11, 2019, 5 pages total, https://github.com/ben-manes/caffeine/wiki/Design.

* cited by examiner

Machine Readable Medium
700

710
Store identifiers of a first set of data blocks in a ring structure comprising a plurality of queues, where each queue is associated with a different priority level

720
For each access of a first data block, increase a heat level associated with the first data block without moving an identifier of the first data block to a higher priority queue

730
Move only identifiers of data blocks in the lowest priority queue with heat values above a threshold to a set of queues associated with a predefined range of priority levels

FIG. 7

RING STRUCTURE OF PRIORITY QUEUES FOR MEMORY CACHE

BACKGROUND

Computing devices may include components such as a processor, memory, caching system, and storage device. The storage device may include a hard disk drive that uses a magnetic medium to store and retrieve data blocks. The caching system may temporarily store copies of data blocks that are also stored in the storage device, and that may be required by the processor in the near future.

BRIEF DESCRIPTION OF THE DRAWINGS

Some implementations are described with respect to the following figures.

FIG. 7 is a diagram of an example machine-readable medium storing instructions in accordance with some implementations.

DETAILED DESCRIPTION

Figure 1:
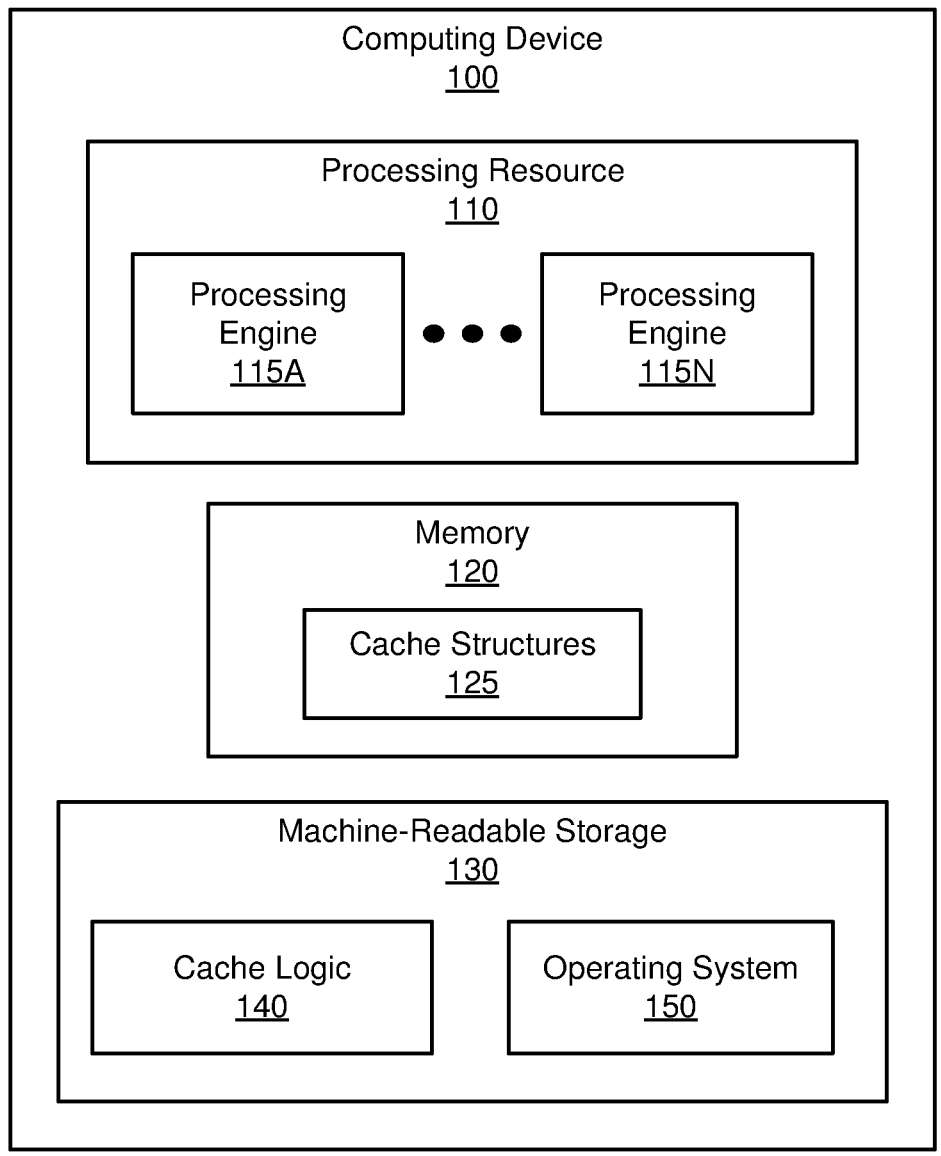
FIG. 1 is a schematic diagram of an example computing device, in accordance with some implementations.

Computing systems may include caching systems to store data blocks that may be used in the near future. One type of caching system is a memory cache, in which data blocks are cached in a dedicated portion of system memory (e.g., dynamic random-access memory). Some caches may use an eviction process to clear out data blocks that are no longer needed in the cache. For example, a thread may traverse or "walk" all data blocks in a memory cache, and may reduce heat values that indicate how recently each data block has been accessed. Further, all blocks may be traversed to identify and evict any data blocks that have heat values below a lower threshold. However, such repeated traversal and evaluation of all data blocks may consume a significant amount of processing bandwidth.

As described further below with reference to FIGS. 1-8, some implementations may provide a ring structure including a rotating set of queues arranged according to priority levels. In each stage of rotation, the blocks identified in a lowest priority queue are evicted, and then a base pointer indicating the lowest priority is moved to the next higher-priority queue. As such, the newly-evicted queue rotates to become the highest priority queue, in effect shifting all other queues down in priority one level, without actually modifying those queues or the data therein. In this manner, the amount of processing required to evict the memory cache may be reduced.

Further, some implementations may include inserting new identifiers of data blocks into a subset of queues corresponding to a predefined range of priority levels. Each of the subset of queues may be associated with one of multiple processing engines. This association between a processing engine and a particular queue may be maintained until that queue is shifted out of the predefined range of priority levels (i.e., by incrementing the base pointer to change the priority levels of the queues). Accordingly, the cached data of the processing engine may be kept together in the same queue for multiple changes of the base pointer. In this manner, performance of the cache may be improved in comparison to a technique that does not maintain an association between a processing engine and a queue. For example, in such a technique that does not maintain this association, the cached data of the processing engine may be inserted into a different queue after each movement of the base pointer, thereby reducing the speed and efficiency of retrieving the cached data for that processing engine.

In addition, some implementations may include maintaining heat values for each data block. The heat value of a given block may be increased when that block is accessed, but the identifier of that block may not be moved to a higher queue. When the lowest priority queue is analyzed for eviction of blocks, the identifiers of blocks with heat values above a threshold may be moved to higher queues at that time, instead of being evicted. As such, the block identifiers are not moved multiple times in response to multiple uses of the data block. Accordingly, because the identifier of a block is only moved once (i.e., when the lowest priority queue is analyzed for eviction of blocks), the processing bandwidth required to maintain active blocks in the cache may be reduced in comparison to techniques that include moving block identifiers in response to each block access.

Referring now to FIG. 1, shown is a schematic diagram of an example computing device 100, in accordance with some implementations. As shown, in some implementations, the computing device 100 may include a processing resource 110, memory 120, and machine-readable storage 130. The processing resource 110 may include one or more of a processor, central processing unit (CPU), processing core, etc. As shown, the processing resource 110 can include any number of processing engines 115A-115N (also referred to as herein as processing engines 115 or processing cores 115). The memory 120 can be any type of computer memory (e.g., dynamic random access memory (DRAM), static random-access memory (SRAM), etc.). In some implementations, the machine-readable storage 130 may be non-transitory storage media such as hard drives, flash storage, optical disks, and so forth.

As shown, in some implementations, memory 120 may include cache structures 125, and the machine-readable storage 130 may include cache logic 140 and an operating system 150. In some examples, the cache logic 140 may be implemented in executable instructions (e.g., software and/or firmware) stored in the machine-readable storage 130. However, the cache logic 140 can be implemented in any suitable manner. For example, some or all of the cache logic 140 could be hard-coded as circuitry included in the processing resource 110. In other examples, some or all of the cache logic 140 could be implemented on a remote computer (not shown), as web services, and so forth. In another example, the cache logic 140 may be implemented in one or more controllers of the computing device 100.

In one or more implementations, the cache logic 140 may manage the data stored in the cache structures 125. For example, the cache logic 140 may control the insertion of data blocks into a cache based on expected use by the processing resource 110 in the near future. In some implementations, the cache logic 140 may maintain a set of queues to store identifiers of data blocks included in a cache.

In some implementations, the cache logic 140 may control the insertion of new block identifiers such that the determination of which queue the new block identifiers are inserted into is based on an associated processing engine 115 (i.e., associated with the blocks corresponding to the new block identifiers). Further, the cache logic 140 may move or evict data blocks from the cache based on values indicating the amount of access of each data block. The cache structures 125 and the cache logic 140 are discussed further below with reference to FIGS. 2-8.

Figure 2:
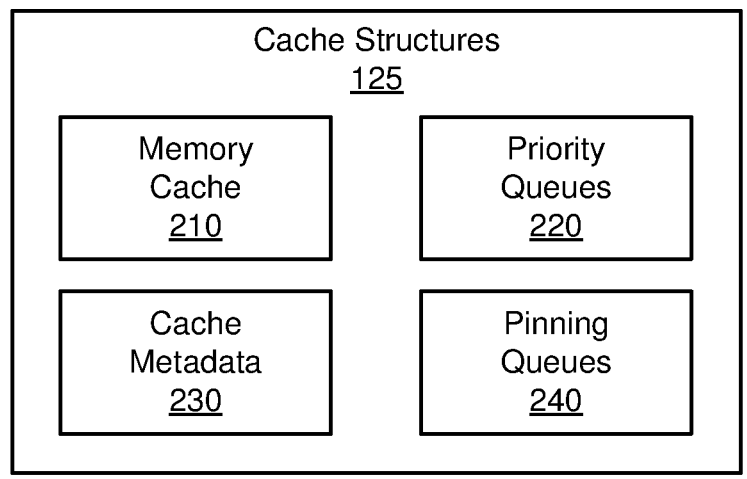
FIG. 2 is an illustration of example caching structures, in accordance with some implementations.

Referring now to FIG. 2, shown is an illustration of example cache structures 125 in accordance with some implementations. As shown in FIG. 2, the cache structures 125 may include some or all of a memory cache 210, priority queues 220, cache metadata 230, and pinning queues 240. In some examples, the memory cache 210 may be implemented in a portion of system memory (e.g., memory 120 shown in FIG. 1), and may store data blocks for use by a processor (e.g., processing resource 110 shown in FIG. 1).

In some implementations, the cache metadata 230 may be a data structure including information about data blocks stored in the memory cache 210. For example, the cache metadata 230 may have multiple fields describing each data block, including a pointer to the location of the data block (e.g., in the memory cache 210), a heat value indicating the level of previous access or usage of the data block, a hash value of the data block, date and time information, size information, block identifiers, and so forth.

In some implementations, the priority queues 220 may be a rotating set of queues (also referred to herein as a "ring structure") to store identifiers of data blocks included in the memory cache 210. Each queue may be associated with a different priority level. The priority levels of queues may be rotated by moving a base pointer that indicates the lowest priority queue (i.e., the queue that currently has the lowest priority level). As used herein, "partial rotation" refers to shifting the base pointer by one queue position. Example implementations of the priority queues 220 are discussed below with reference to FIGS. 3A-4D.

In some implementations, the pinning queues 240 may store identifiers of data blocks that should not be evicted from the memory cache 210 under normal eviction procedures. For example, a specific set of data blocks may be covered by a quality of service (QOS) agreement specifying that the data must remain in memory. In such an example, the pinning queues 240 may store the identifiers of the data blocks covered by the QOS agreement. The pinning queues 240 are separate from the priority queues 220, and are not rotated in the same manner as the priority queues 220. In some examples, the identifiers of a first set of data blocks in the memory cache 210 are stored in the priority queues 220, and the identifiers of a different second set of data blocks (e.g., QOS blocks) are stored in the pinning queues 240.

Figure 3A:
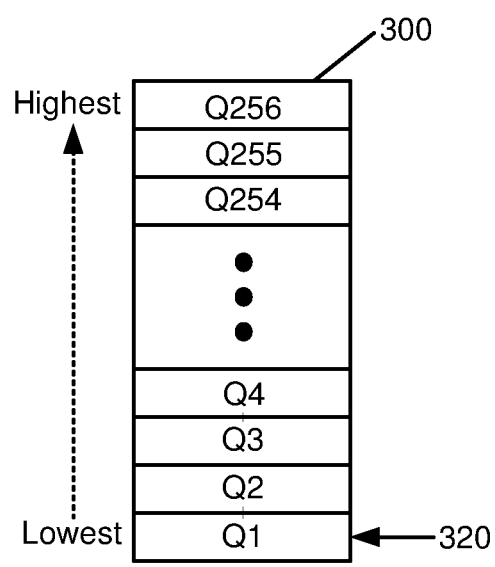
FIGS. 3A-3C are illustrations of an example operation, in accordance with some implementations.
Figure 3B:
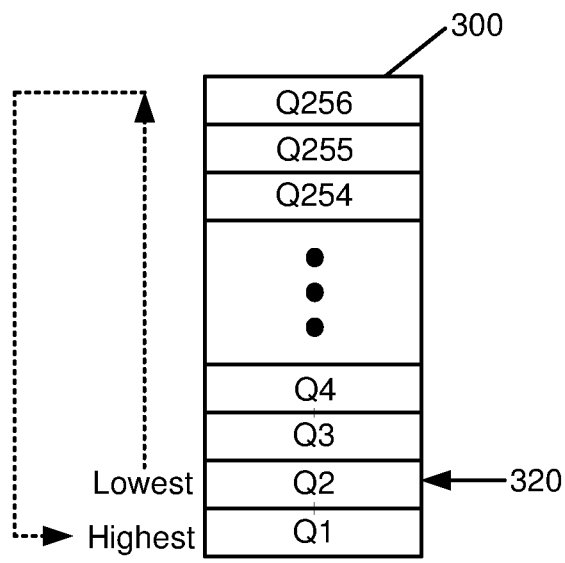
Figure 3C:
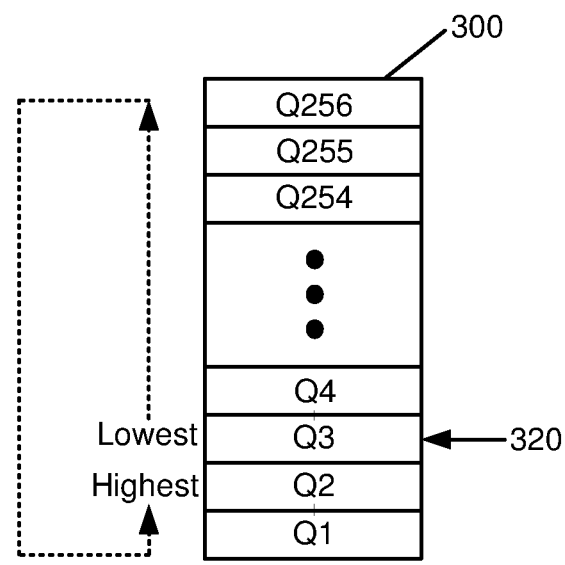

Referring now to FIGS. 3A-3C, shown is an example ring structure 300 at various points in time, in accordance with some implementations. The ring structure 300 may correspond generally to an example implementation of the priority queues 220 (shown in FIG. 2). In some examples, the ring structure 300 may include 256 separate queues Q1-Q256 (e.g., as in FIGS. 3A-3C). However, implementations are not limited in this regard, and thus the ring structure 300 may include any number of queues.

Referring to FIG. 3A, a base pointer 320 indicates that the lowest numbered queue Q1 is the lowest priority queue at a first point in time. Further, the priority of the queues may increase according to order in the ring structure 300 (e.g., Q2 has a higher priority than Q1 but a lower priority than Q3, etc.). In some examples, the priority level of a queue may correspond to the offset or distance from the base pointer 320. Accordingly, in the example of FIG. 3A, the highest numbered queue Q256 (i.e., the most distant queue from the base pointer 320) is the highest priority queue at the first point in time.

In some implementations, an eviction process may be performed exclusively for data blocks currently identified in the current lowest priority queue in the ring structure 300. For example, as part of an eviction process, at the first point in time shown in FIG. 3A, a cache manager (e.g., cache logic 140 shown in FIG. 1) may determine the heat values of blocks identified in the lowest priority queue Q1, and may evict those blocks with heat values below a predefined threshold. Further, in some examples, the cache manager may move blocks with heat values above or equal to the threshold to a set of queues having a predefined range of priority levels (e.g., queues Q242-Q245).

In one or more implementations, after evicting or moving all blocks in the lowest priority queue, the cache manager may perform a partial rotation by shifting the base pointer 320 to the next queue in the ring structure 300 having a higher priority level than the current lowest priority queue (i.e., at the first point in time). For example, referring to FIG. 3B, the base pointer 320 has been moved by one position to indicate that queue Q2 is the lowest priority queue at a second point in time. In some implementations, the priority levels rotate in a circular manner with the ring structure 300, such that priority levels for the queues move from a "bottom" (e.g., one end) of the ring structure 300 (i.e., queue Q1) toward a "top" (e.g., another end) of the ring structure 300 (i.e., queue Q256), with the priority level at the top of the ring structure 300 (i.e., queue Q256) rotating to the bottom of the ring structure 300 (i.e., queue Q1). Accordingly, as shown in FIG. 3B, queue Q1 becomes the highest priority queue at the second point in time. Further, referring to FIG. 3C, the base pointer 320 has been moved again to indicate that Q3 is the lowest priority queue at a third point in time. Accordingly, Q2 becomes the highest priority queue at the third point in time.

In one or more implementations, identifiers of data blocks are inserted exclusively into specific ranges of priority levels (referred to herein as "insertion ranges") within the ring structure 300. Further, in some implementations, different insertion ranges may be used for different types of data. For example, data blocks associated with execution of an application (e.g., program instructions, variables etc.) may be inserted into a first insertion range, while data blocks associated with memory addressing (e.g., index blocks) may be inserted into a second insertion range.

In some implementations, data blocks associated with different processing engines may be inserted into different queues within an insertion range. As used herein, a data block "associated with" a processing engine refers to a data block that is cached for use during execution by that processing engine. Further, in some implementations, the association between a given processing engine and a specific queue may be maintained for multiple partial rotations. For example, referring to FIGS. 4A-4D, shown are examples of maintaining associations between processing engines and queues, in accordance with one or more implementations. In the example of FIGS. 4A-4D, new block identifiers associated with processing engines PE1-PE4 are inserted exclusively into a subset of queues that correspond to an insertion range 400 of priority levels L14-L11. In some implementations, the functions and/or actions illustrated in FIGS.

4A-4D may be performed using some or all of the cache logic 140 and cache structures 125 (shown in FIG. 1).

Figure 4A:
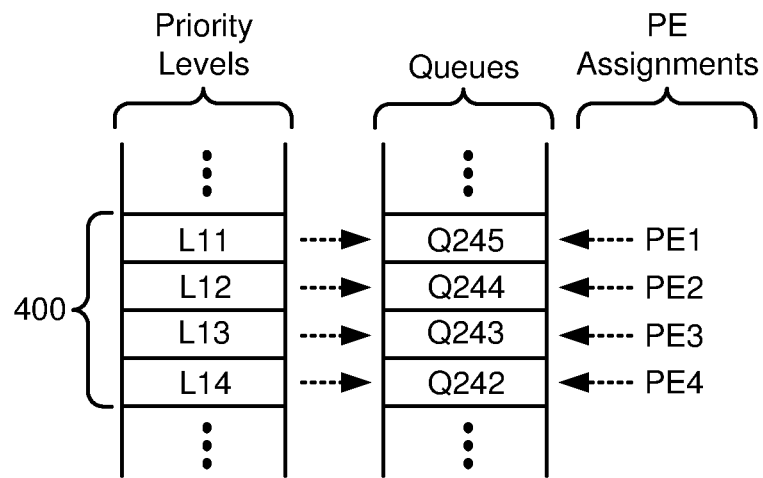
FIGS. 4A-4D are illustrations of an example operation, in accordance with some implementations.

Referring to FIG. 4A, in that example, a subset of queues Q242-Q245 corresponds to the insertion range 400 (i.e., priority levels L14-L11) at a first point in time. The queues Q242-Q245 may correspond generally to an example portion of the priority queues 220 (shown in FIG. 2) and/or the ring structure 300 (shown in FIG. 3). As shown, processing engine PE1 is associated with queue Q245 (having priority level L11) at the first point in time, such that new block identifiers associated with processing engine PE1 are inserted into queue Q245. Further, as shown, processing engine PE2 is associated with queue Q244 (having priority level L12), processing engine PE3 is associated with queue Q243 (having priority level L13), and processing engine PE4 is associated with queue Q242 (having priority level L14) at the first point in time.

Figure 4B:
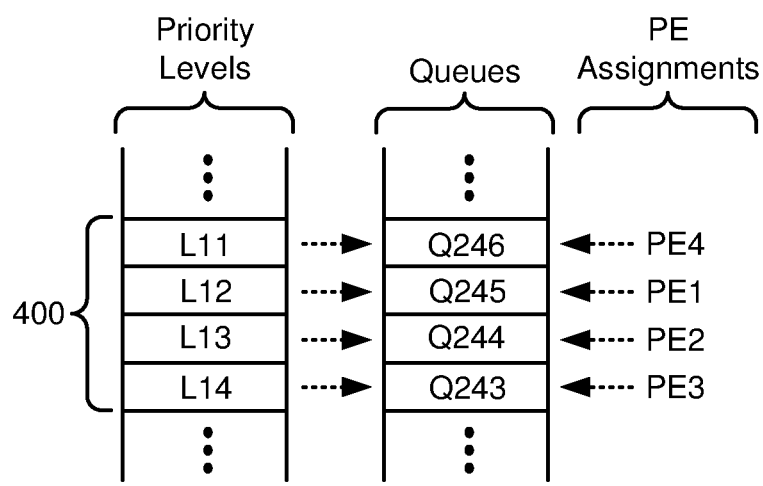

Referring now to FIG. 4B, a partial rotation of the priority queues has been performed in this example, such that the base pointer (not shown) has been moved up by one queue position (e.g., as described above in relation to FIGS. 3A-3C). Accordingly, as shown in FIG. 4B, the priority levels L11-L14 have been shifted by one (e.g., toward the top of the ring structure) such that the subset of queues Q243-Q246 now corresponds to the insertion range 400 (i.e., priority levels L14-L11) at a second point in time. In some implementations, each association between a processing engine and a queue location is maintained until that queue location is shifted out of the insertion range 400. For example, as shown in FIGS. 4A and 4B, processing engine PE1 remains associated with queue Q245 (now having priority level L12, but still in the insertion range 400), processing engine PE2 remains associated with queue Q244 (now having priority level L13, but still in the insertion range 400), and processing engine PE3 remains associated with queue Q243 (now having priority level L14, but still in the insertion range 400). In contrast, the priority levels have shifted such that queue Q242 (previously associated with priority level L14 and processing element PE4) is no longer in the insertion range 400 that is predefined for inserting new block identifiers. Accordingly, in the example of FIG. 4B, the processing element PE4 is associated with queue Q246 that is in the range of priority levels L14-L11 after they have been shifted as shown in FIG. 4B.

Figure 4C:
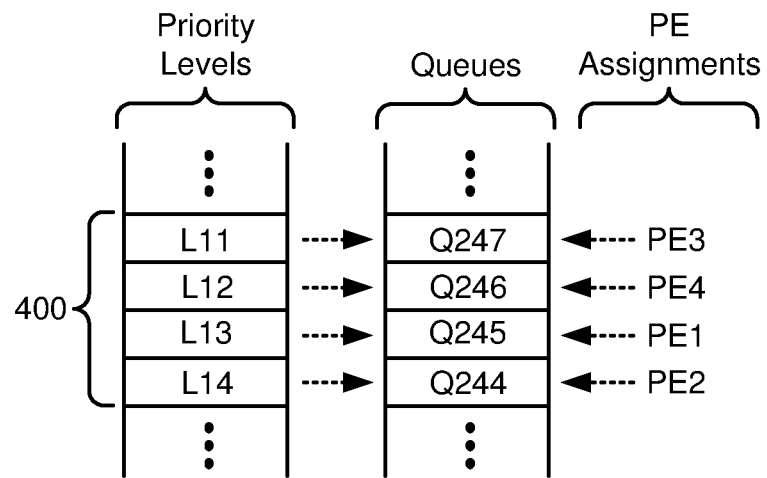

Referring now to FIG. 4C, after another partial rotation, the subset of queues Q244-Q247 now corresponds to the insertion range 400 at a third point in time. As shown, processing engines PE1, PE2, PE4 remain associated with queues Q245, Q244, Q246, respectively, since queues Q245, Q244, and Q246 remain associated with the insertion range 400. In contrast, the priority levels have shifted such that queue Q243 (previously associated with priority level L14 and processing element PE3) is no longer in the insertion range 400. Accordingly, in the example of FIG. 4C, the processing element PE3 is associated with queue Q247 that is in the range of priority levels L14-L11 after they have been shifted as shown in FIG. 4C.

Figure 4D:
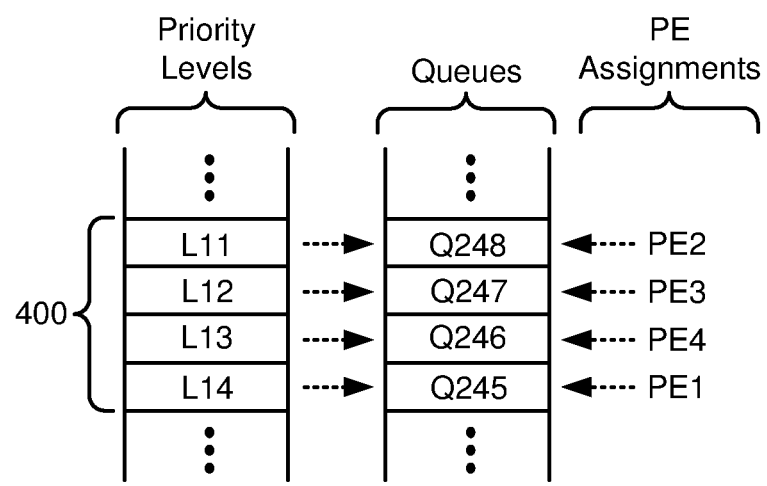

Referring now to FIG. 4D, after yet another partial rotation, the subset of queues Q245-Q248 corresponds to the insertion range 400 at a fourth point in time. As shown, processing engines PE1, PE4, and PE3 remain associated with queues Q245, Q246, and Q247, respectively, since queues Q245, Q246, and Q247 remain associated with the insertion range 400. In contrast, the priority levels have shifted such that queue Q244 (previously associated with priority level L14 and processing element PE2) is no longer in the insertion range of priority levels L14-L11. Accordingly, in the example of FIG. 4D, the processing element PE2 is associated with queue Q248 that is in the range of levels L14-L11 after they have been shifted as shown in FIG. 4D.

Note that, in the examples illustrated in FIGS. 4A-4D, the association between a processing engine and a queue is maintained for three out of four partial rotations. Accordingly, for implementations in which N queues which can receive new block identifiers (where N is an integer greater than one), the cached data of a processing engine may be kept together in the same queue for N-1 partial rotations. As such, the caching performance for that processing engine may be improved in comparison to systems in which the new block identifiers associated with a processing engine are inserted into a different queue after each partial rotation. Accordingly, some implementations may provide improved performance of a caching system.

Figure 5:
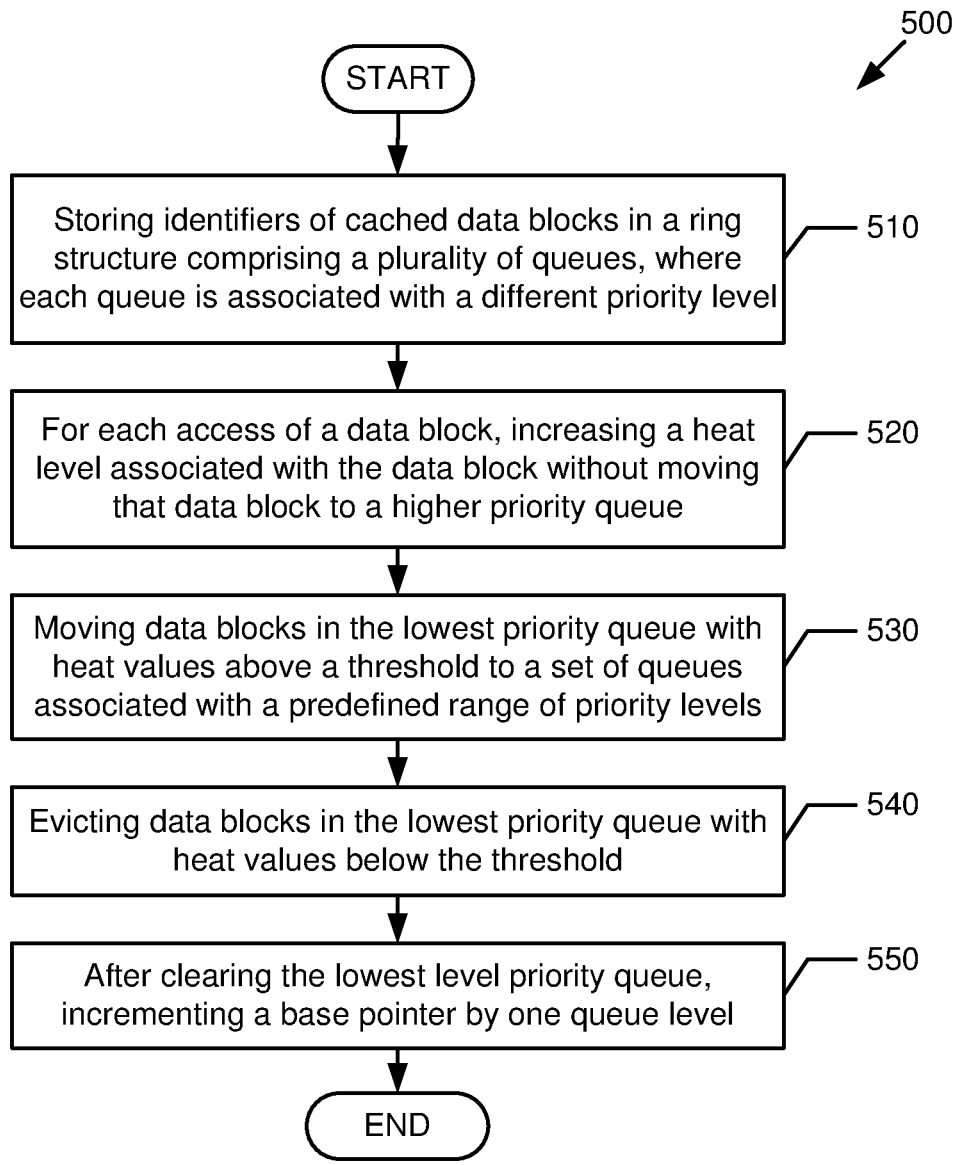
FIG. 5 is an illustration of an example process, in accordance with some implementations.

Referring now to FIG. 5, shown is an example process 500, in accordance with some implementations. In some examples, the process 500 may be performed using some or all of the cache logic 140 and cache structures 125 (shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 500 may be described below with reference to FIGS. 1-4D, which show examples in accordance with some implementations. However, other implementations are also possible.

Block 510 may include storing identifiers of cached data blocks in a ring structure comprising a plurality of queues, where each queue is associated with a different priority level. For example, referring to FIGS. 1 and 3A, the cache logic 140 may generate and/or maintain the ring structure 300. In some examples, the ring structure 300 includes queues Q1-Q256 that are associated with different priority levels (e.g., ordered from lowest priority to highest priority). Further, in some examples, the priority levels of the ring structure 300 may be rotated by moving the base pointer 320.

Block 520 may include, for each access of a data block, increasing a heat level associated with the data block without moving that data block to a higher priority queue. For example, referring to FIGS. 1-2, the cache logic 140 may detect an access or other use of a data block stored in the memory cache 210, and in response may increase a heat value associated with that data block. In some examples, the heat values of data blocks may be stored in fields of the cache metadata 230.

Block 530 may include moving data blocks in the lowest priority queue with heat values above a threshold to a set of queues associated with a predefined range of priority levels. Block 540 may include evicting data blocks in the lowest priority queue with heat values below the threshold. For example, referring to FIGS. 1-4A, the cache logic 140 may access heat values for each data block identified in the lowest priority queue Q1, and may compare these heat values to a threshold heat value. Further, the cache logic 140 may evict all data blocks with heat values below the threshold, and may move all data blocks with heat values above the threshold to a set of queues with a predefined range of priorities (e.g., insertion range 400 including priority levels L11-L14).

Block 550 may include, after clearing the lowest level priority queue, incrementing a base pointer by one queue level. For example, referring to FIGS. 1-3B, the cache logic 140 may perform a partial rotation by shifting the base pointer 320 to queue Q2. Accordingly, after the partial rotation, queue Q2 is the lowest priority queue, and queue Q1 is the highest priority queue. After block 550, the process 500 is completed. Note that blocks 520-550 may be repeated for multiple partial rotations, thereby evicting only the lowest priority queue of the ring structure 300 at different points in time or iterations.

Figure 6:
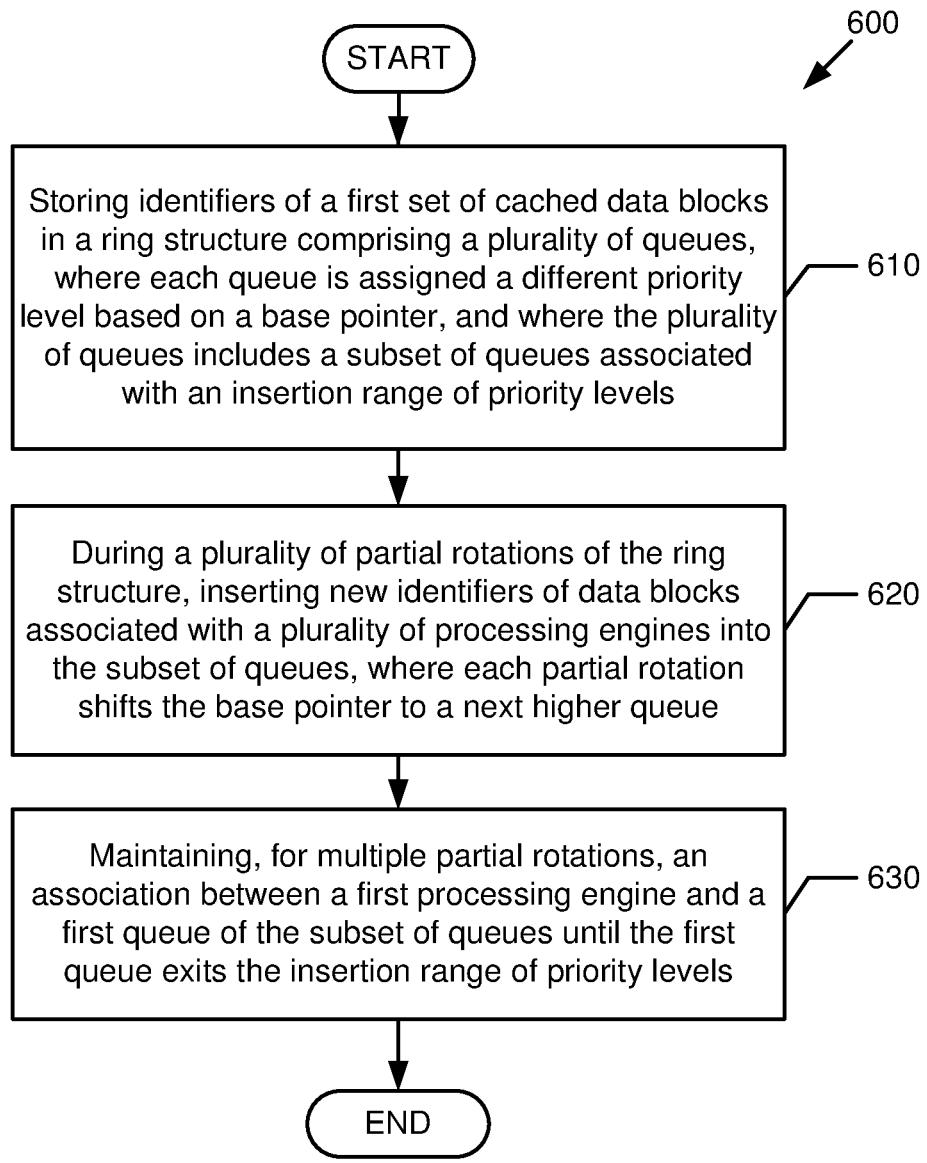
FIG. 6 is an illustration of an example process, in accordance with some implementations.

Referring now to FIG. 6, shown is an example process 600, in accordance with some implementations. In some examples, the process 600 may be performed using some or all of the cache logic 140 and cache structures 125 (shown in FIG. 1). The process 600 may be implemented in hardware and/or machine-readable instructions (e.g., software and/or firmware). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 600 may be described below with reference to FIGS. 1-4D, which show examples in accordance with some implementations. However, other implementations are also possible.

Block 610 may include storing identifiers of a first set of cached data blocks in a ring structure comprising a plurality of queues, where each queue is assigned a different priority level based on a base pointer, and where the plurality of queues includes a subset of queues associated with an insertion range of priority levels. For example, referring to FIGS. 1 and 3A, the cache logic 140 may generate the ring structure 300 including queues Q1-Q256 associated with corresponding priority levels. The base pointer 320 may indicate the lowest priority queue of the ring structure 300.

Block 620 may include, during a plurality of partial rotations of the ring structure, inserting new identifiers of data blocks associated with a plurality of processing engines into the subset of queues, where each partial rotation shifts the base pointer to a next higher queue. For example, referring to FIG. 4A, new block identifiers associated with processing engines PE1-PE4 are inserted into the subset of queues Q242-Q245 that correspond to the insertion range 400 (i.e., priority levels L14-L11) at a first point in time. Further, referring to FIG. 4B, after a partial rotation, new block identifiers associated with processing engines PE1-PE4 are inserted into the subset of queues Q243-Q246 that correspond to the insertion range at a second point in time.

Block 630 may include maintaining, for multiple partial rotations, an association between a first processing engine and a first queue of the subset of queues until the first queue exits the insertion range of priority levels. For example, referring to FIG. 4B, after a partial rotation processing engines PE1, PE2, PE3 remain associated with queues Q245, 244, 243, respectively. However, queue Q242 has shifted out of the insertion range 400 (i.e., priority levels L14-L11), and thus processing element PE4 is instead associated with queue Q246 after the partial rotation. After block 630, the process 600 is completed. Note that blocks 610-630 may be repeated for multiple partial rotations. Accordingly, the association between a processing engine and a queue is maintained for multiple partial rotations, and thus the cached data of each processing engine can be kept in the same queue for multiple partial rotations.

Referring now to FIG. 7, shown is machine-readable medium 700 storing instructions 710-730, in accordance with some implementations. The instructions 710-730 can be executed by a single processor (e.g., the processing resource 110 shown in FIG. 1), multiple processors, a single processing engine, multiple processing engines, and so forth. The machine-readable medium 700 may be a non-transitory storage medium, such as an optical, semiconductor, or magnetic storage medium.

Instruction 710 may be executed to store identifiers of a first set of data blocks in a ring structure comprising a plurality of queues, where each queue is associated with a different priority level. Instruction 720 may be executed to, for each access of a data block, increase a heat level associated with the data block without moving an identifier of the first data block to a higher priority queue. Instruction 730 may be executed to move only identifiers of data blocks in the lowest priority queue with heat value above a threshold to a set of queues associated with a predefined range of priority levels.

Figure 8:
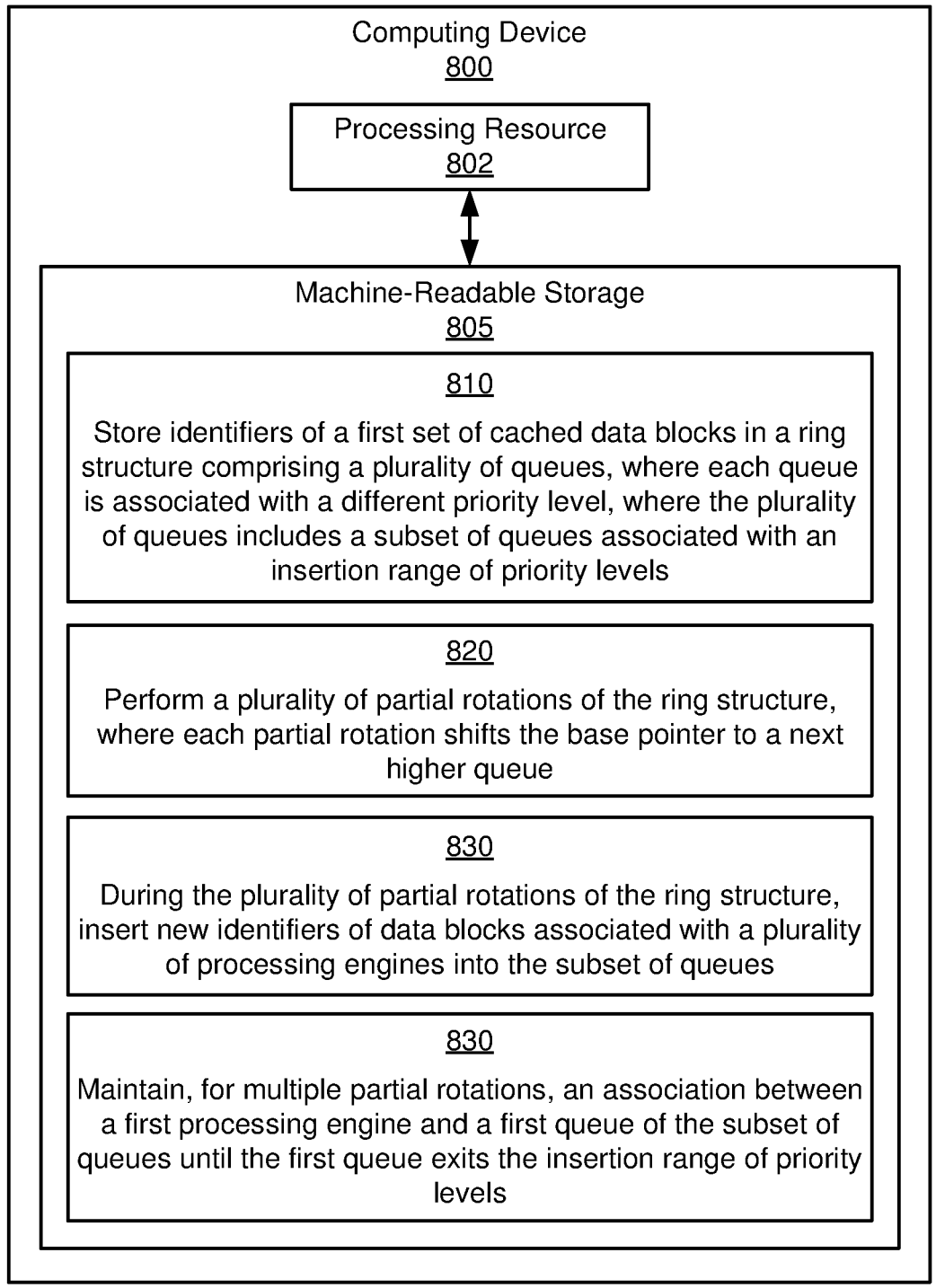
FIG. 8 is a schematic diagram of an example computing device, in accordance with some implementations.

Referring now to FIG. 8, shown is a schematic diagram of an example computing device 800. In some examples, the computing device 800 may correspond generally to the computing device 100 (shown in FIG. 1). As shown, the computing device 800 may include hardware processor 802 and machine-readable storage 805 including instruction 810-830. The machine-readable storage 805 may be a non-transitory medium. The instructions 810-830 may be executed by the hardware processor 802, or by a processing engine included in hardware processor 802.

Instruction 810 may be executed to store identifiers of a first set of cached data blocks in a ring structure comprising a plurality of queues, where each queue is associated with a different priority level, where the plurality of queues includes a subset of queues associated with an insertion range of priority levels. Instruction 820 may be executed to perform a plurality of partial rotations of the ring structure, where each partial rotation shifts the base pointer to a next higher queue. Instruction 830 may be executed to, during the plurality of partial rotations of the ring structure, insert new identifiers of data blocks associated with a plurality of processing engines into the subset of queues. Instruction 840 may be executed to maintain, for multiple partial rotations, an association between a first processing engine and a first queue of the subset of queues until the first queue is shifted out of the insertion range of priority levels.

Note that, while FIGS. 1-8 show various examples, implementations are not limited in this regard. For example, referring to FIG. 1, it is contemplated that the computing system 100 may include additional components, fewer components, different components, different arrangements, and so forth. In another example, referring to FIG. 2, it is contemplated that the priority queues 220 may be used without using the pinning queues 240 in some implementations. Further, it is contemplated that the pinning queues 240 may be used without using the priority queues 220 in other implementations. In yet another example, referring to FIGS. 3A-3C, it is contemplated that the ring structure 300 may include any number of queues. In still another example, referring to FIGS. 4A-4D, it is contemplated that the insertion range may include any number of queues. Further, each processing engine may be associated with multiple queues within the insertion range. Other combinations and/or variations are also possible.

In accordance with some implementations, examples are provided for a caching system using rotating priority queues. In some examples, new block identifiers may be inserted into an insertion range. The queues in the insertion range may be associated with different processing engines, and this association may be maintained for multiple partial rotations. In this manner, the performance of the cache may be improved. Further, some examples may include maintaining heat values for each data block. When a lowest priority queue is analyzed for eviction, any blocks with heat values above a threshold may be moved once to higher queues instead of being evicted. In this manner, the processing bandwidth required to maintain active blocks in the cache may be reduced.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computer implemented method, comprising:
   storing identifiers of cached data blocks stored in a ring structure comprising a plurality of queues, wherein each queue is assigned a different priority level based on a base pointer, and wherein the plurality of queues includes a subset of queues associated with an insertion range of priority levels;
   during a plurality of partial rotations of the ring structure, inserting new identifiers of data blocks associated with a plurality of processing engines into the subset of queues, wherein each partial rotation shifts the base pointer to a next higher queue; and
   maintaining, for multiple partial rotations, an association between a first processing engine and a first queue of the subset of queues until the first queue exits the insertion range of priority levels.

2. The computer implemented method of claim 1, wherein the
   prior to a first partial rotation of the ring structure, inserting new identifiers of data blocks associated with the first processing engine into a lowest priority queue of the subset of queues; and
   subsequent to the first partial rotation of the ring structure, inserting new identifiers of data blocks associated with the first processing engine into a highest priority queue of the subset of queues.

3. The computer implemented method of claim 1, comprising:
   storing, in the first queue of the plurality of queues, a first identifier for a first data block, wherein a first data block is associated with a first heat value that indicates a level of access of the first data block; and
   incrementing the first heat value in response to an access of the first data block, wherein the first identifier is not moved to a higher priority queue in response to the access of the first data block, wherein the first identifier is moved to a lower priority queue during each partial rotation of the ring structure.

4. The computer implemented method of claim 3, comprising:
   determining whether the first identifier is stored in a lowest priority queue of the ring structure;
   in response to a determination that the first identifier is stored in the lowest priority queue of the ring structure, determining whether the first heat value exceeds a heat threshold; and
   in response to a determination that the first heat value exceeds the heat threshold, moving the first identifier to one of the subset of queues.

5. The computer implemented method of claim 4, comprising:
   in response to a determination that the first heat value does not exceed the heat threshold, evicting the first identifier from the plurality of queues.

6. The computer implemented method of claim 1, comprising:
   storing identifiers for a second set of data blocks in a plurality of pinning queues, wherein the plurality of pinning queues are separate from the ring structure.

7. A computing device comprising:
   a processor comprising a plurality of processing engines; and
   a machine-readable storage storing instructions, the instructions executable by the processor to:
   store identifiers of a first set of cached data blocks in a ring structure comprising a plurality of queues, wherein each queue is associated with a different priority level, wherein the plurality of queues includes a subset of queues associated with an insertion range of priority levels;
   perform a plurality of partial rotations of the ring structure, wherein each partial rotation shifts the base pointer to a next higher queue;
   during the plurality of partial rotations of the ring structure, insert new identifiers of data blocks associated with a plurality of processing engines into the subset of queues; and
   maintain, for multiple partial rotations, an association between a first processing engine and a first queue of the subset of queues until the first queue exits the insertion range of priority levels.

8. The computing device of claim 7, the instructions executable by the processor to:

while the first queue remains in the insertion range of priority levels, insert new identifiers of data blocks associated with the first processing engine into the first queue;

perform a first partial rotation that causes the first queue to shift out of the insertion range of priority levels; and after the first partial rotation and prior to another partial rotation, insert new identifiers of data blocks associated with the first processing engine into a highest priority queue of the subset of queues.

9. The computing device of claim 7, the instructions executable by the processor to:

store, in the first queue of the plurality of queues, a first identifier for a first data block, wherein a first data block is associated with a first heat value that indicates a level of usage of the first data block; and increment the first heat value in response to an access of the first data block, wherein the first identifier is not moved to a higher priority queue in response to the access of the first data block, wherein the first identifier is moved to a lower priority queue during each partial rotation of the ring structure.

10. The computing device of claim 9, the instructions executable by the processor to:

in response to a determination that the first identifier is stored in a lowest priority queue of the ring structure, determine whether the first heat value exceeds a heat threshold; and in response to a determination that the first heat value exceeds the heat threshold, move the first identifier to one of the subset of queues.

11. The computing device of claim 10, the instructions executable by the processor to:

in response to a determination that the first heat value does not exceed the heat threshold, evict the first identifier from the plurality of queues.

12. The computing device of claim 7, wherein each partial rotation of the ring structure comprises moving a base pointer to a next higher queue, and wherein the subset of queues comprises a continuous range of multiple priority queues from the highest priority queue of the subset to the lowest priority queue of the subset.

13. The computing device of claim 7, the instructions executable by the processor to:

store identifiers for a second set of data blocks in a plurality of pinning queues, wherein the plurality of pinning queues are separate from the ring structure.

14. A non-transitory machine-readable medium storing instructions that upon execution cause a processor to:

store identifiers of a first set of data blocks in a ring structure comprising a plurality of queues, wherein each queue is associated with a different priority level;

for each access of a first data block, increase a heat level associated with the first data block without moving an identifier of the first data block to a higher priority queue; and move only identifiers of data blocks in a lowest priority queue with heat values above a threshold to a set of queues associated with a predefined range of priority levels.

15. The non-transitory machine-readable storage medium of claim 14, including instructions to cause the processor to:

evict identifiers of data blocks in the lowest priority queue with heat values below the threshold.

16. The non-transitory machine-readable storage medium of claim 15, including instructions to cause the processor to:

after clearing the lowest priority queue, perform a partial rotation by incrementing a base pointer by one queue level.

17. The non-transitory machine-readable storage medium of claim 14, including instructions to cause the processor to:

during a plurality of partial rotations of the ring structure, insert new identifiers of data blocks associated with a plurality of processing engines into a subset of queues, wherein the subset of queues is associated with an insertion range of priority levels.

18. The non-transitory machine-readable storage medium of claim 17, including instructions to cause the processor to:

maintaining, for multiple partial rotations, an association between a first processing engine and a first queue of the subset of queues until the first queue is shifted out of the insertion range of priority levels.

19. The non-transitory machine-readable storage medium of claim 17, wherein the subset of queues comprises a continuous range of multiple priority queues.

20. The non-transitory machine-readable storage medium of claim 14, including instructions to cause the processor to:

store identifiers for a second set of data blocks in a plurality of pinning queues, wherein the plurality of pinning queues are separate from the ring structure.

* * * * *